June 24, 1969 C. BRYNKO 3,451,811
ELECTROPHOTOGRAPHIC IMAGING PROCESSES USING ELECTRICALLY
PHOTOSENSITIVE PHOTOCHROMIC MATERIALS
Filed July 1, 1965

INVENTOR.
CARL BRYNKO
BY James J. Ralabate
Ronald Zibelli
ATTORNEYS

United States Patent Office 3,451,811

Patented June 24, 1969

3,451,811
ELECTROPHOTOGRAPHIC IMAGING PROCESSES USING ELECTRICALLY PHOTOSENSITIVE PHOTOCHROMIC MATERIALS

Carl Brynko, West Webster, N.Y., assignor to Xerox Corporation, Rochester, N.Y., a corporation of New York Filed July 1, 1965, Ser. No. 468,899
Int. Cl. G03g *13/04, 5/06, 13/08*
U.S. Cl. 96—1 12 Claims

ABSTRACT OF THE DISCLOSURE

An image is formed on the surface of a dry imaging member comprising a photochromic material which exhibits a change in electrical conductivity upon exposure to electromagnetic radiation capable of converting at least a portion of the photochromic material from one photochromic state to another by exposing the dry imaging member to a source of said electromagnetic radiation, charging the surface of the member and developing the surface with electroscopic marking material.

This invention relates in general to a novel imaging system, and more specifically, to an electrostatic imaging system employing light induced changes in the electrical properties of organic photochromic compounds.

Materials which undergo reversible photo-induced color change are referred to as photochromic. In the absence of actinic radiation these materials have a relatively stable configuration with a characteristic absorption spectrum. However, when a photochromic material is exposed to actinic radiation such as ultraviolet light, the absorption spectrum changes drastically so that the appearance of the material changes from colorless to red, red to green or the like. These property changes are believed to occur because of changes in the molecular or electronic configuration of the material from a lower to a higher energy state. These changes occur because the photochromic materials generally have very efficient routes for the internal conversion of absorbed excited state electronic energy into vibrational and torsional twisting modes of the molecule upon exposure to light. This conversion may, for example, result in the isomerization of the molecule. The conversion of each molecule normally takes place at an extremely rapid speed but actual observation of a change in color in conventional systems takes longer because of the relatively low concentration produced per unit time and the depletion of the excited colored form by the competing but slower reconversion to the lower unexcited form. Accordingly, photochromic materials of lower conversion efficiency tend to produce pale color changes at best.

Unfortunately, the higher, colored form of the photochromic material exists in an excited, unstable condition which reverts to the lower form with its original absorption band and color after the source of actinic radiation is removed. Since imaging techniques proposed in the prior art employ the color change to make the image, these materials cannot be used in permanent imaging systems. Although an enormous amount of time, money and effort has been expended by many research organizations on attempting to stabilize the higher forms of a great many different photochromoic compounds so as to make them suitable for use in practical imaging systems and, although some success has been achieved in slowing down the reconversion of the higher to the lower form of some photochromic compounds with various modifications of their substituents, no one has to date yet succeeded in permanently stabilizing these higher forms. Additional effort has been devoted to the problem of achieving maximum color change from the lower to the higher form of various photochromic compounds, but even had these goals been achieved the problem of deactivating the lower form of photochromic material in background areas would still remain. In essence then, there have been two fixing problems in photochromic imaging involving both the stabilization of the higher colored form in exposed areas and the deactivation of the lower uncolored form in background areas of the image, and neither of these problems has been effectively solved. Consequently, the phenomenom of photochromism has remained largely a laboratory curiosity rather than an effective and commercially acceptable means of imaging.

It is accordingly an object of this invention to provide a novel imaging system.

It is a further object of the present invention to provide a novel imaging method based on the use of organic photochromic compounds.

Another object of this invention is to provide an imaging system which can effectively employ even those photochromic materials which exhibit little or no visible change in color on exposure.

A still further object of the invention is to provide an imaging method and apparatus utilizing photochromic compounds in which the image generated by image-wise exposure of the compound serves only as a temporary latent image for the developing and fixing steps which produce the permanent image that in no way depends upon the permanency of the higher form of the photochromic compound itself.

Yet another object of this invention is to provide a novel imaging method and apparatus in which photochromic compounds are employed in plates for electrostatic printing or copying.

The above and still further objects of the present invention are accomplished, generally speaking, by providing a system in which a layer of a photochromic compound is exposed to an image with actinic electromagnetic radiation. This exposure source may constitute a source of visible light, ultraviolet light, X-ray or any other radiation source which is capable of converting the particular photochromic compound from one form to the other. After image-wise conversion of at least a portion of the photochromic layer from one state to the other, the photochromic layer is charged, and because of the marked difference in charge transporting ability between the two states of the same photochromic compound a latent electrostatic image is formed on the photochromic layer. It should be emphasized here that the exposure must only convert enough photochromic molecules to produce a significant difference between the electrical properties of the exposed and unexposed areas. Because of the relatively small number of molecules which must be converted to fulfill this requirement, with some materials a visible color change need not necessarily be produced in all instances. This latent image on the photochromic layer is then developed by the deposition thereon of finely divided, colored electroscopic developing material. Charging and exposure may also be carried out simultaneously. Once the image is developed it may be rendered permanent on the photochromic imaging layer by heat or solvent vapor fusing of the developing particles thereto or the pattern of particles may be transferred to another surface and fixed thereon. Where transfer is employed the layer may be used as an electrostatic printing plate by repeating the charging, developing and transfer steps. Since the exposed areas of the layer remain in the excited photochromic state for a finite decay period which is fairly long in some cases, repeated uniform charging of this layer results in the repeated formation of a charge pattern corresponding to the original exposure. Any time a change in the pattern is desired the photochromic may be uniformly converted to one form or another, and then re-imaged as described above. In the case of some photochromic Spiropyran compounds, for example, the imaging exposure is made with ultraviolet light while erasure is effected with yellow light.

The photochromic layer may be composed solely of one or more photochromic compounds providing that at least one state of the photochromic compound has the requisite resistivity to hold the charge pattern long enough for development to take place. For convenience, however, the photochromic material will generally be dispersed or dissolved in solid solution in an insulating resin. This resin may be thought of as a binder or matrix for the photochromic material.

The use of such an insulating resin as a binder or matrix for the photochromic compound permits the choice of the photochromic compound to be made from an even larger group of materials including even those which have relatively low electrical resistivity in both the excited and the unexcited states, owing to the increased degree of resistivity which is imparted to the overall film by the resin. Since many photochromic compounds are relatively expensive the use of the resin also serves to decrease the overall cost of the imaging layer.

In order that the invention will be more clearly understood, reference is now made to the accompanying drawings in which an embodiment of the invention is illustrated by way of example and in which.

Figure 1:
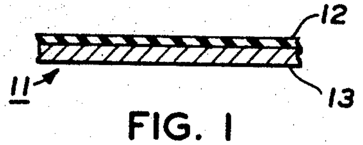
FIGURE 1 is a side sectional view of an imaging member made according to the invention.

Referring now to FIGURE 1, there is seen an imaging member generally designated 11 made up of a photoresponsive layer 12 on a supporting substrate 13. A conductive material, such as copper, brass, aluminum, silver, gold, transparent tin oxide on glass or the like, may be employed to fabricate layer 13 so that the substrate will provide mechanical strength to the imaging member and will also serve as a conductive ground plane to facilitate electrical charging of the imaging member during the process as more fully described hereinafter. In the event that a charging technique which does not require a ground plane is employed and assuming that imaging layer 12 has sufficient mechanical strength of itself, the conductive substrate layer 13 may be eliminated from the system. One charging technique of this type is two-sided corona charging as described, for example, in U.S. Patent 2,922,883. Imaging layer 12, may as stated above, consist entirely of a photochromic compound providing the compound has adequate strength and electrical resistivity in at least one of its states and further providing that it is strong enough to have structural integrity when coated.

Since most photochromic compounds are relatively expensive as compared with insulating resins which are suitable for use in combination therewith and since some photochromic have low physical strength, low resistivity or other properties which are undesirable for use in an imaging layer, as described above, the photochromic will generally be dissolved in or dispersed in an insulating resin. Any suitable resin may be used. Typical insulating resins include Staybelite Ester 10 and Pentalyn H, pentaerythritol and glycerol esters, respectively, of partially (50%) hydrogenated rosin sold by the Hercules Powder Co. of Wilmington, Delaware; Velsicol EL–11, a terpolymer of styrene, indene and isoprene, marketed by the Velsicol Chemical Co. of Chicago, Ill.; polyalphamethyl styrene; Piccolyte S–70 and S–100 (polyterpene resins made predominantly from beta pinene available from the Pennsylvania Industrial Chemical Co. and having ring and ball melting points of 70° C. and 100° C., respectively); Piccopale 70SF and 85 (non-reactive olefin-diene resins, available from the Pennsylvania Industrial Chemical Co. having melting points of 70° C. and 85° C. and molecular weights of 800 and 100, respectively); Piccodiene 2212 (a styrene-butadiene resin available from the same company); Piccolastic A–75, D–100 and E–100 (polystyrene resins with melting points of 75° C., 100° C. and 100° C. available from the same company); Neville R–21, R–9 and Nevillac Hard (cumaroneindene resins); Amberol ST137X (an unreactive, unmodified phenolformaldehyde resin available from Rohm & Haas); ethyl cellulose; ethyl hydroxy cellulose; nitrocellulose; ethyl acrylate polymer; methyl acrylate polymer, methyl methacrylate polymer; Carboset XH–1 (an acrylic acid polymer available from B. F. Goodrich Co.); Aroclor 1242 (a chlorinated polyphenyl); Pliolite AC (a styrene-acrylate copolymer); Pliolite VTAC (a vinyl toluene-acrylate copolymer); and Neoyln 23 (an alkyd resin available from Hercules Powder Co.) chlorinated rubber; paraffin wax; polycarbonates; polyurethanes; epoxies; polyvinyl chloride; polyvinylidene chloride; polyvinyl butyral; shellac; amine-formaldehydes; polyvinyl acetals; silicones; phenoxies; polyvinyl fluorides and mixtures and copolymers thereof.

As stated above, the percentage of photochromic compound in the imaging coating 12 may range anywhere from 100% by weight of photochromic compound down to about 1% by weight of photochromic with the remainder being a resin of the type described herein. Any suitable photochromic compound may be employed. Typical photochromic compounds include: spiropyrans such as 1,3,3-trimethyl-6′-nitro-8′-allyl-spiro (2′H-1′-benzopyran-2,2′-indoline);
1,3,3-trimethyl-5,6′-dinitro-spiro (2′H-1′-benzopyran-2,2′-indoline);
1,3,3-trimethyl-7′-nitro-spiro (2′H-1′-benzopyran-2,2′-indoline);
3-methyl-6-nitro-spiro-[2H-1-benzopyran-2,2′-(2′H-1′-beta-naphthopyran)];
1,3,3-trimethyl-8′-nitro-spiro (2′H-1′-benzopyran-2,2′-indoline);
1,3,3-trimethyl-6′-methoxy-8′-nitro-spiro (2′H-1′-benzopyran-2,2′-indoline);
1,3,3-trimethyl-7-methoxy-7′ chloro-spiro (2′H-1′-benzopyran-2,2-indoline);
1,3,3-trimethyl-5-chloro-5′ nitro-8′-methoxy-spiro (2′H-1′-benzopyran-2,2′-indoline);
1,3-dimethyl-3-isopropyl-6′ nitro-spiro (2′H-1′-benzopyran-2,2′-indoline);
1-phenyl-3,3-dimethyl-6′-nitro-8′-methoxy-spiro (2′H-1′-benzopyran-2,2′-indoline);
7′-nitro-spiro-[xantho-10,2′ (2′H-1′-benzobetanaphthopyran)];
3,3′-dimethyl-6′-nitro-spiro (2′H-1′-benzopyran-2,2′-benzothiazole);
3,3′-dimethyl-6′-nitro-spiro (2′H-1′-benzopyran 2,2′-benzo-oxazole);
1,3-trimethyl-6′-nitro-spiro (2′H-1′-benzopyran-2,2′-indoline);
6′-nitro-8′-methoxy-1,3,3-trimethylindolinobenzopyrylospiran;
6′-nitro-1,3,3-trimethylindolinobenzopyrylospiran;
8′-allyl-1,3,3-trimethylindolinobenzopyrylospiran;
8′-carbomethoxy-1,3,3-trimethylindolinobenzopyrylospiran;
8′-methoxy-1,3,3-trimethylindolinobenzopyrylospiran;
6′,8′-dinitro-1,3,3-trimethylindolinobenzopyrylospiran;
7′-nitro-1,3,3-trimethylindolinobenzopyrylospiran;
8′-nitro-1,3,3-trimethylindolinobenzopyrylospiran;
6′,8′-dibromo-1,3,3-trimethylindolinobenzopyryrlospiran;
6′-chloro-8′-nitro-1,3,3-trimethylindolinobenzopyrylospiran;
5-nitro-6′-nitro-1,3,3-trimethylindolinobenzopyrylospiran;

6'-nitro-8'-fluoro-1,3,3-trimethylindolinobenzopyrylo-spiran;
6'-methoxy-8'-nitro-1,3,3-trimethylindolinobenzopyrylo-spiran;
5'-nitro-8'-methoxy-1,3,3-trimethylindolinobenzopyrylo-spiran;
6'-bromo-8'-nitro-1,3,3-trimethylindolinobenzopyrylo-spiran;
anthrones such as bianthrone;
xanthylideneanthrone;
4,4'-methylanthrone;
4,4'-methoxybianthrone;
3-chloro-10-(9'-xanthylidene)-anthrone;
3-methyl-10-(9'-xanthylidene)-anthrone;
4'-chloro-10-(9'-xanthylidene)-anthrone; and
10'-9'-2'-methyl xanthylidene)-anthrone;

sydnones such as

N-(3-pyridyl)-sydnone;
N-benzylsydnone;
N-p-methylbenzyl-sydnone;
N-3,4-dimethylbenzylsydnone;
N-p-chlorobenzylsydnone;
N,N'-ethylene-bissydnone; and
N,N'-tetramethylenebissydnone;

anils such as salicylidene aniline;

5-bromo salicylidene-alpha-naphthylamine;
salicylidene-m-phenylenediamine;
salicylidene-m-phenylenediamine;
salicyclidene-m-toluidene;
salicylidene 3,4-xylidene;
salicylidene-p-anisidine;
o-nitrobenzidene-p-aminobiphenyl;
o-nitrobenzidine-m-nitroaniline;
o-nitrobenzidine-p-phenetidine;
salicylidene-p-aminobenzoic acid;
p-hydroxy benzidine-p-bromoaniline;
p-hydroxy-benzidene 2,4-xylidine;
2-hydroxy-3-methoxybenzidene 2,5-xylidine; and
salicylidene-o-chloroaniline;

hydrazones such as the 2,4-dinitro-phenylhydrazone of 5-nitro-salicylaldehyde;

benzaldehyde beta-naphthyl-hydrazone;
benzaldehyde anisylhydrazone;
benzaldehyde-m-chloro-phenylhydrazone;
benzaldehyde-p-bromophenylhydrazone;
cinnamaldehyde phenylhydrazone;
cinnamaldehyde beta-naphthylhydrazone;
cinnamaldehyde m-tolyl-hydrazone;
cinnamaldehyde p-tolylhydrazone;
cinnamaldehyde 3,4-xylylhydrazone;
p-dimethylamino benzaldehyde beta-naphthylhydrazone;
2-furaldehyde beta-naphthylhydrazone;
1-phenol-1-hexen-3-one-phenylhydrazone;
piperonal anisylhydrazone;
piperonal m-chloro-phenylhydrazone;
piperonal beta-naphthylhydrazone;
piperonal m-tolylhydrazone;
p-tolualdehyde phenylhydrazone;
vanillin beta-naphthylhydrazone;

osazones such as benzil beta-naphthyl-osazone;
benzil m-tolylosazone;
benzil 2,4-xylylosazone;
4,4'-dimethoxy benzil beta-naphthylosazone;
4,4'-dimethoxy benzil phenylosazone;
4,4'-dimethoxy benzil-2,4-xylylosazone;
3,4,3'4'-bis(methylenedioxy) benzil alpha-naphthyl-osazone;
3,4,3',4'-bis(methylenedioxy) benzil 2,4-xylylosazone;

semicarbazones such as chalcone semicarbazone;
chalcone phenyl semicarbazone;
2-nitrochalcone semicarbazone;
3-nitrochalcone semicarbazone;
cinnamaldehyde semicarbazone;
cinnamaldehyde thiosemicarbazone;
o-methoxy cinnamaldehyde semicarbazone;
o-methoxy cinnamaldehyde thiosemicarbazone;
o-methoxy cinnamaldehyde phenylsemicarbazone;
1-(4-methoxyphenyl)-5-methyl-1-hexen-3-one-semicarbazone;
1-(1-naphthyl)-1-hexen-3-one-semicarbazone;
1-phenyl-1-penten-3-one-semicarbazone;

stilbene derivatives such as 4,4'-diformamido-2,2'-stilbene disulfonic acid;
4,4'-diacetamido-2,2'-stilbene disulfonic acid and its sodium, potassium barium, strontium, calcium, magnesium and lead salts;
4,4'-bis(4-acetamidobenzoyleneamido)-2,2'-stilbene disulfonic acid;
4,4'-bis(p-(p-acetamido-benzamido)benzamido)-2,2'-stilbene disulfonic acid;
fulgides (substituted succinic anhydrides) such as alpha-anisyl-gamma-phenyl fulgide;
alpha, gamma-dianisyl fulgide;
alpha, gamma-dicumyliso fulgide;
alpha, gamma-diphenyl fulgide;
alpha, gamma-distyryl fulgide;
alpha-piperonyl-gamma-phenyl fulgide;
tetraphenyl fulgide;
amino-camphor compounds such as 3-(p-dimethyl amino-phenylamino)-camphor and
3-(p-diethylaminophenylamino)-camphor;
4'-dinitrobenzyl pyridine;
2,4,2'-trinitrodiphenylmethane;
thio indigo dyes;
o-nitrobenzyl derivatives such as
2-(2',2,4,2',4',2'',4''-hexanitro-triphenylmethane;
ethyl bis(2,4-dinitrophenyl)acetate;
2-(2'-nitro-4'-carboxybenzyl pyridine;
3,3'-dinitro-4,4'-bis(2-pyridylmethyl)-azoxybenzene; and
4-(2'-nitro-4-cyanobenzyl)pyridine.

The spiropyrans are, however, a preferred class of materials owing to their superior and more sensitive imaging capabilities. Whether photoresponsive layer 12 consist of a pure photochromic compound or a blend of a photochromic compound with a resin as described above, it may be coated on the substrate or formed into a self-supporting layer by a convenient technique such as dip coating, extrusion, whirl coating, casting or the like using either a hot melt or a solution of the materials to be coated.

Figure 2:
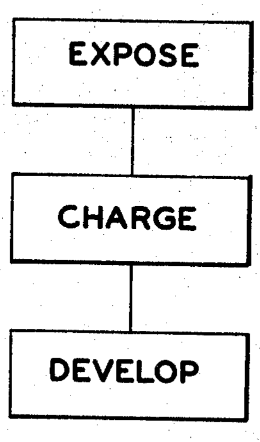
FIGURE 2 is a flow diagram of the process steps of the invention.

As shown in FIGURE 2 the basic steps involved in carrying out the process of this invention involve exposing the photoresponsive layer 12 of the imaging 11 to an image-wise pattern of actinic electromagnetic radiation, applying electrostatic charge to this layer and developing this pattern to make it visible. It should be understood that even though the process steps may be carried out in the specific sequence described above charging may take place prior to exposure or they may be carried out together. In exposing to the image to be reproduced any source of electromagnetic radiation which is actinic to the photochromic material may be employed. In the case of most photographic compounds in their lower or unexcited forms an ultraviolet radiation source may be conveniently employed to expose the material in image-wise configuration so as to convert exposed areas to the higher or excited form of the material, although light of this short wavelength is not always required. Since many photochromic materials in their higher or excited forms may be "triggered" or caused to revert to the lower unexcited form by exposure to visible light, a light source in the visible range (from about 4000–7500 angstrom units) may be conveniently employed for image-wise exposure of a photochromic film which had initially been uniformly converted to the higher or excited form. This type of exposure will then convert exposed areas to the unexcited or lower form of the photochromic material while the background or unexposed areas remain in the excited form. Providing that the image is developed before the background areas of the photochromic material revert to the lower unexcited form this technique may be conveniently employed for positive to negative imaging. The intensity of the exposure need not necessarily be strong enough to produce an intense color change in the photochromic compound since with most materials this requires a conversion of a gross amount of the photochromic from one form to the other, while to be operative in the processs of this invention only enough photochromic material must be converted so that a differential charge pattern can be formed on imaging layer 12. The term "photochromic" should be understood in this context as it is used throughout the specification and claims.

Any suitable electrostatic charging technique may be employed to carry out the charging step. Typical electrostatic charging technique include corona discharge as described in U.S. Patent 2,588,699 to Carlson; 2,836,725 to Vyverberg; and 2,777,957 to Walkup; induction charging as described in U.S. Patent 2,833,930 to Walkup and triboelectric charging by rubbing the surface to be charged with a material remote from it in the triboelectric series as described in the xerographic process in U.S. Patent 2,297,691 to Carlson. Various development techniques may be employed to render visible the latent electrostatic image produced by the charging and exposure steps. Typical of these are cascade development as described in U.S. Patents 2,618,551 and 2,618,552; magnetic brush development as described in U.S. Patent 3,015,305 to Hall; touchdown and skid development as described in U.S. Patent 2,895,847 to Mayo; powder cloud development as described in U.S. Patent 2,918,910 to Carlson; liquid spray development as described in U.S. Patent 2,551,582 to Carlson; immersion development as described in U.S. Patent 2,907,674 or any one of a number of other development techniques conventionally used in the xerographic art. Once development has been completed the developed image may either be fixed in place on the surface of the imaging layer or transferred to a second surface or transfer sheet and fixed thereon so that the imaging layer can be reused. Transfer of the pattern of developer from the imaging layer to the transfer sheet may be accomplished by any suitable technique such as by electrostatic attraction as described in U.S. Patent 2,576,047 to Schaffert or by coating the transfer sheet with an adhesive for the developer material or the like. Whether the developer is fixed on the surface of the imaging layer or fixed on the sheet to which it is first transferred, it may be fixed in place either by heating it if a thermoplastic developer such as the one described in Carlson Reissue Patent 25,136 is employed or by spraying it with a solvent for the resin in the developing material or by overcoating the transferred image with an adherent layer or the like. In the event that it is desired to produce a number of identical copies from the same original only one exposure of the photochromic is required. Since the excited form of the photochromic compound will not revert to the unexcited form for a finite period of time, which for most photochromics is fairly long, the steps of charging, developing and transferring may be carried out repeatedly after the first exposure so that the imaging layer acts in effect as a printing plate. If on the other hand it is desired to make only one copy of an original and then to use the imaging layer to copy another, different original, the photochromic image formed by the first exposure is erased prior to making the second exposure. This may be accomplished by intense exposure to a visible light source with some materials. Thus, for example, with the photochromic spiropyrans imaging is generally carried out with ultraviolet light and erasure with light from the yellow portion of the visible spectrum. After erasure the imaging layer is returned to its original condition so that the second image can be formed in exactly the same way as the first image was formed.

Figure 3:
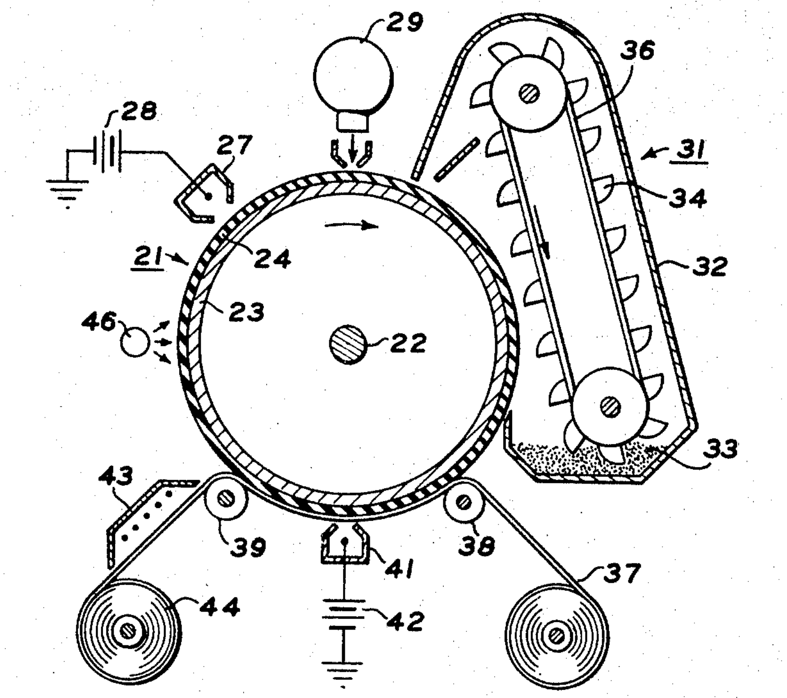
FIGURE 3 is a side sectional view of an illustrative embodiment of an apparatus adapted for imaging according to the invention.

In FIGURE 3 there is illustrated a simple exemplary apparatus for carrying out the imaging technique of the invention. This apparatus consists of a cylindrical imaging drum 21 mounted for rotation about a horizontal axis 22. The drum 21 consists of a supporting metal substrate 23 and a photochromic imaging layer 24 of the type described supra. Although the particular substrate material used is aluminum any one of a number of other conductive materials such as copper, brass, gold, steel, tin oxide, or the like may be used. It is also to be noted that although the drum is in the form of a rigid cylinder it may take many of the shapes including that of a flat plate, a polygon, an ellipse or the like and may be flexible as well as rigid. As the drum rotates in the direction indicated by the arrow it is first charged with a charging unit 27 connected to a source of high positive potential 28. The charging unit 27 contains one or more wire filaments which are connected to the potential source and operate on the corona discharge technique as described for example in the aforementioned corona charging patents to Carlson and Walkup. Essentially this technique consists of spacing a filament slightly from the surface of the drum with the conductive base of the drum grounded and applying a high potential to the filaments so that a corona discharge occurs between the filament and the drum thereby serving to deposit charged, ionized, air molecules on its surface and raising its level of potential with respect to ground. The photochromic layer on the drum will hold its charge prior to light exposure because in the unexcited condition it has a relatively high resistivity. As the drum continues to rotate at a uniform velocity it passes an ultraviolet light projector 29 for exposing the charged plate to the image to be reproduced. This exposure step serves to dissipate charge from areas of the layer which are exposed to light resulting in a residual charge pattern corresponding to the original image projected. As explained above the exposure and charging steps may be reversed or carried out simultaneously, if desired. Other sources of radiation may be employed for exposure depending upon the sensitivity of the particular photochromic compound being employed. Subsequent to the formation of this residual charge pattern or latent electrostatic image by the charging and exposure stations of the apparatus, the drum surface moves past a developing unit generally designated 31. The illustrated developing unit is of the cascade type which includes an outer container or cover 32 with a trough at its bottom containing a supply of developing material 33. The developing material is picked up from the bottom of the container and dumped or cascaded over the drum surface by a number of buckets 34 on an endless driven conveyor belt 36. This development technique which is more fully described in the aforementioned cascade development patents utilizes a two-element developing mixture including toner particles and grossly larger carrier beads. The carrier beads serve both to deagglomerate the toner particles and to charge them by virtue of rubbing together of the carrier and toner in the apparatus. In other words the toner is both carried and tribo-electrically charged by the carrier beads. These beads also serve to impart better flow characteristics to the finely divided toner particles owing to the size and weight of the carrier beads. When the beads with toner particles clinging to them are cascaded over the drum surface the electrostatic field from the residual charge pattern on the drum pulls toner particles off the carrier beads serving to develop the pattern. The carrier beads along with any toner particles not used to develop the image then fall back into the bottom of the container 32. As a general rule the toner and carrier materials are selected so that the charge triboelectrically imparted to the toner is opposite in polarity to the residual charge pattern on the drum so that particles are deposited on charged areas. However, in specialized instances the toner particles may be charged to the same polarity as the residual charge pattern so that background areas bearing no charge are developed. Once development has taken place the drum bearing the developed powder image moves around until it comes in contact with a copy web 37 which is pressed up against the drum surface by two idle rollers 38 and 39 so that the web moves at the same speed as the periphery of the drum. A transfer unit 41 is placed behind the web and spaced slightly from it between the rollers 38 and 39. This unit is similar in principle to the charging mechanism 27, 28 and also operates on the corona discharge principle. The transfer unit is connected to a source of high potential 42, of the same polarity as that employed in the charging unit 27, so that it deposits charge on the back of web 37 which is of the same polarity as the charge pattern on imaging layer 21 and is opposite in polarity to the charge on toner particles utilized in developing the plate. As more fully described in U.S. Patent 2,576,047 to Schaffert the application of this corona discharge of the back of the web serves to transfer the developed toner particle image from the surface of the drum to the web. Once the toner image has been transferred to web 37 the web is separated from contact with the drum and passes beneath a radiant heat fixer 43 which fuses the toner particles to the web whereupon it is wound up on take-up reel 44. After separation from the web, the drum continues in its path of rotation passing beneath an intense yellow light source 46 which converts the excited state photochromic material in the UV light exposed areas back to the lower unexcited state thereby erasing the original image and readying the plate for reuse in the copying cycle. When it is desired to produce multiple copies of the same original this may be accomplished by merely turning off the two light sources 29 and 46 and continuing to operate the remainder of the apparatus in the previously described fashion.

The following illustrative examples of preferred embodiments of the invention are now given to enable those skilled in the art to more clearly understand and practice the invention described above. Unless otherwise indicated all parts and percentages are taken by weight.

Example I

Two grams of 6′-nitro-1,3,3-trimethylindolinobenzopyrylospiran and 4 grams of Staybelite Ester 10 resin (described above) are dissolved in 94 grams of toluene. This solution is dip coated in the dark to a thickness of about 1 micron on an aluminum plate and air dried. The dried film is then exposed to an image with a 9-watt fluorescent light available from the Eastern Corporation of Westbury, Long Island under the trade name "Blacklite" using a filter which passes about a 10 angstrom bandwidth centered on 3660 angstroms. After image-wise exposure a maroon colored image is seen to form on the film. The film is then charged by passing it under a 3-wire corotron held at 8500 volts positive with respect to the aluminum base of the plate. The image created by the exposure on the coating shows a charge retention of about 400 volts in unexposed areas and 50 volts in the exposed areas when measured with an electrometer under normal ambient lighting in the laboratory. Following charging the film is developed with a cascade developer of the type described above and this developed image is transferred to a paper sheet and heat fused to form a high quality reproduction of the original. Ten additional duplicate images are formed without reexposure by merely charging developing and transfer.

Example II

The procedure of Example I is repeated except that the charging electrode is held at a negative potential with respect to the plate with approximately the same results.

Examples III and IV

The procedure of Example I is repeated with the exception that in Example II 4 grams of the Staybelite Ester resin and ½ gram of the 6′-nitro-1,3,3-trimethylindolinobenzopyrylospiran are used in the coating solution while in Example IV the ratio is 1 gram of resin to 2 grams of the same photochromic spiran compound. Each of these produce about equal results with those produced by Example I.

Examples V–XVI

The procedure of Example I is followed exactly with the exception that the following resins are substituted for the Staybelite Ester resin of Example I in Examples V–XVI, respectively; Piccolyte S–70, Piccolyte S–100, Piccopale 70SF, Piccopale 85, Piccodiene 2212, alphamethylstyrene polymer, Amberol ST137X, Piccolastic D–100, Piccolastic E–100, Neville R–9, Neville R–21, and Nevillac Hard. All produce about the same results as Example I.

Example XVII–XXII

In examples XVII and XVIII the procedure of Example I is repeated except that the photochromic compound employed is 3-N-pyridyl sydnone in Example XVII and phenyl sydnone in Example XVIII.

In Examples XIX–XXII the following photochromic compounds are employed. In Example XIX bianthrone is employed; in Example XX 9-xanthylidene anthrone is employed; in Example XXI the 2,4,-dinitrophenylhydrazone of 5-nitro-salicylaldehyde is employed; and in Example XXII 3-N-pyridyl salicylidene is employed. In these four examples the procedure of Example I is followed except that the same filter is employed with a 100 watt light source for a 20 minute exposure. In all instances the images formed are about equal in quality with the one produced by the procedure of Example I except that the last two examples produce reversal (positive to negative) images, apparently because the excited form of these photochromics is more conductive than the unexcited form.

Example XXIII

The procedure of Example I is repeated exactly except that the coated film is first uniformly exposed to the 3660 angstrom light source until it achieves a deep maroon color. Following this exposure a transparency to be reproduced is overlaid on the imaging layer and exposed to a source of yellow light for one hour which serves to bleach or reconvert the excited colored form of the photochromic compound back to its unexcited, colorless form in exposed areas. The charging and development steps of Example I are then carried out resulting in a photographic reversal of the original transparency.

Examples XXIV–XXX

The procedure of Example I is followed with the exception that Amberol ST–137X resin is substituted for the Staybelite Ester resin of Example I and following photochromic compounds are used respectively, in Examples XXIV–XXX in place of the spiropyran photochromic compound of Example I: 2,4-dinitro-phenylhydrazone; benzil beta-naphthylosazone; 2-nitrochalcone semicarbazone; alpha, gamma-diphenyl fulgide; 4,4′-diformamido-2,2′-stilbene disulfonic acid; 3-(p-dimethylaminophenylamino)-camphor; and 2-(2′,4′-dinitrobenzyl) pyridine. These produce essentially the same results as Example I when a 20 minute exposure is employed.

Examples XXXI–XXXVI

The procedure of Example I is repeated except that the following resins are substituted for the Staybelite Ester 10, in Examples XXXI–XXXVI, respectively; ethyl hydroxy cellulose; ethyl cellulose; nitrocellulose; polyethylacrylate; polymethyl acrylate and polymethylmethacrylate. All produce about the same results as Example I and the latent conductivity pattern is seen to persist in all cases for at least 12 hours after exposure.

Although specific materials and conditions are set forth in the above examples, these are merely illustrative of the present invention. Various other materials, such as any of the typical photochromic and/or insulating resins listed above which are suitable, may be substituted for the materials listed in the examples with similar results. The films of the invention may also have other materials mixed, dispersed, copolymerized or otherwise added thereto to enhance, sensitize, synergize or otherwise modify the properties thereof. For example, a great many sensitizers are known to accelerate the conversion of photochromic compounds from one photochromic state to the other and any of these which are suitable for use herein may be employed. In addition to carrying out the process steps simultaneously or sequentially many other modifications and/or additions to the process will readily occur to those skilled in the art upon reading this disclosure, and these are intended to be encompassed within the spirit of the invention. Thus, for example, the charge pattern may be formed on the photochromic layer and then transferred to another insulating layer so that the visible image may be formed thereon.

What is claimed is:

1. An imaging process for forming an electroscopic marking material image on the surface of an imaging member comprising the steps of providing a dry imaging member comprising an organic photochromic material, the molecules of which exhibit a change in electrical conductivity upon exposure to electromagnetic radiation capable of converting at least a portion of said material from one photochromic state to another, exposing said dry imaging member to a pattern of said electromagnetic radiation, charging said surface of said member, and developing said surface with electroscopic marking material to form an electroscopic marking material image corresponding to said pattern.

2. An imaging process according to claim 1 in which said photochromic material is in its lower, unexcited state prior to the step of exposing said dry imaging member to said pattern of electromagnetic radiation to convert the exposed areas thereof to a higher excited state having increased conductivity.

3. An imaging process according to claim 1 in which said photochromic material is in its higher excited state prior to the step of exposing said dry imaging member to said electromagnetic radiation to convert exposed areas thereof to a lower unexcited photochromic state having decreased conductivity.

4. An imaging process according to claim 3 including exposing said dry imaging member to a visible light capable of causing said photochromic material to return to a lower unexcited state in exposed areas.

5. An imaging process according to claim 1 further including the steps of transferring said electroscopic marking material image to a receiving sheet and repeating the charging, developing and transfer steps at least once.

6. An imaging process according to claim 1 further including the steps of returning the converted photochromic material to the photochromic state existing prior to exposure to said pattern of electromagnetic radiation.

7. An imaging process according to claim 6 wherein said photochromic material is a 1,3,3-trimethylindolinobenzopyrylospiran and said photochromic material is exposed to yellow light to return said photochromic material to the photochromic state existing prior to exposure to said pattern of electromagnetic radiation.

8. An imaging process for forming an electroscopic marking material image on the surface of an imaging member comprising the steps of providing a dry imaging member comprising a solid solution of an insulating resin and an organic photochromic material, the molecules of which exhibit a change in electrical conductivity upon exposure to electromagnetic radiation capable of converting at least a portion of said material from one photochromic state to another, exposing said dry imaging material to a pattern of said electromagnetic radiation, charging said surface of said member, and developing said surface with electroscopic marking material to form an electroscopic marking material image corresponding to said pattern.

9. An imaging process according to claim 8 in which said imaging member comprises from about 1 part by weight of said photochromic material to about 8 parts by weight of said resin to about 1 part by weight of said photochromic material to about ½ part by weight of resin.

10. An imaging process according to claim 8 in which said photochromic material comprises 6′-nitro-1,3,3-trimethylindolinobenzoprylospiran.

11. A photographic method comprising exposing an imaging layer comprising a photochromic 1,3,3-trimethylindolinobenzopyrylospiran material to a pattern to be reproduced with an actinic electromagnetic radiation source of sufficient energy to convert at least a portion of said material from one photochromic state to another, charging said imaging layer and developing the latent electrostatic image formed thereon with an electroscopic marking material.

12. A method according to claim 8 in which said photochromic material comprises 6′-nitro-1,3,3-trimethylindolinobenzopyrylospiran.

References Cited

UNITED STATES PATENTS

| | | | |
|---|---|---|---|
| 3,081,165 | 3/1963 | Ebert | 96—1 |
| 3,113,022 | 12/1963 | Cassiers et al. | 96—1 |
| 3,311,471 | 3/1967 | Hepher | 96—1.5 |
| 3,346,385 | 10/1967 | Foris | 96—36 |

OTHER REFERENCES

Exelby and Grinter: Chem. Reviews, vol. 65, 1965, pp. 247–260 (248, 254, 255).

Theoretical and Experimental Investigations of Photochromic Memory Techniques and Devices, AD #273512, p. 7.

NORMAN G. TORCHIN, *Primary Examiner.*

J. C. COOPER III, *Assistant Examiner.*

U.S. Cl. X.R.

96—1.5, 90